US009648089B2

(12) United States Patent
Mukherji et al.

(10) Patent No.: US 9,648,089 B2
(45) Date of Patent: May 9, 2017

(54) CONTEXT-AWARE HYPOTHESIS-DRIVEN AGGREGATION OF CROWD-SOURCED EVIDENCE FOR A SUBSCRIPTION-BASED SERVICE

(71) Applicant: Samsung Electronics Co., Ltd., Suwon-si, Gyeonggi-do (KR)

(72) Inventors: Abhishek Mukherji, Milpitas, CA (US); Evan Welbourne, San Francisco, CA (US); Emmanuel Munguia Tapia, Newark, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 456 days.

(21) Appl. No.: 14/262,635

(22) Filed: Apr. 25, 2014

(65) Prior Publication Data
US 2015/0310347 A1 Oct. 29, 2015

(51) Int. Cl.
*G06F 15/18* (2006.01)
*H04L 29/08* (2006.01)

(52) U.S. Cl.
CPC ............ *H04L 67/10* (2013.01); *H04L 67/306* (2013.01)

(58) Field of Classification Search
CPC ................................ G06N 7/005; H04W 4/02
USPC ...................................................... 706/12, 45
See application file for complete search history.

(56) References Cited

U.S. PATENT DOCUMENTS

| | | | |
|---|---|---|---|
| 8,566,309 B2 | 10/2013 | Jennings | |
| 8,903,848 B1 * | 12/2014 | Bahrami | G06F 17/30424 455/456.2 |
| 2008/0167960 A1 | 7/2008 | Hughes | |
| 2012/0047143 A1 | 2/2012 | Petersen et al. | |
| 2012/0064919 A1 | 3/2012 | Purdy | |
| 2012/0096089 A1 | 4/2012 | Barash et al. | |
| 2012/0215446 A1 | 8/2012 | Schunder et al. | |
| 2012/0233207 A1 | 9/2012 | Mohajer | |
| 2012/0245952 A1 | 9/2012 | Halterman et al. | |
| 2012/0246718 A1 | 9/2012 | Spears et al. | |
| 2012/0330869 A1 | 12/2012 | Durham | |
| 2013/0029769 A1 | 1/2013 | Lee | |

(Continued)

FOREIGN PATENT DOCUMENTS

| | | |
|---|---|---|
| WO | 2006110853 A2 | 10/2006 |
| WO | 2008109821 A1 | 9/2008 |

OTHER PUBLICATIONS

Bellotti, et al., Activity-Based Serendipitous Recommendations with the Magitti Mobile Leisure Guide, 2008, CHI Proceedings, pp. 1-10.*

(Continued)

*Primary Examiner* — David Vincent
(74) *Attorney, Agent, or Firm* — Sherman IP LLP; Kenneth L. Sherman; Hemavathy Perumal

(57) ABSTRACT

A method and system for providing an answer to a subscription-based query service. The method includes acquiring context information and evidence information from one or more electronic devices based on a query. One or more belief values are assigned based on the evidence information and the context information. The belief values are aggregated for determining a score for competing hypotheses using a probabilistic model. Sufficiency of hypotheses is determined based on statistical significance for potential answer information to the query.

30 Claims, 10 Drawing Sheets

(56) References Cited

U.S. PATENT DOCUMENTS

| | | | |
|---|---|---|---|
| 2013/0066693 | A1 | 3/2013 | Laird-McConnell et al. |
| 2013/0066972 | A1 | 3/2013 | McLeod |
| 2013/0090961 | A1 | 4/2013 | Smith |
| 2013/0173172 | A1 | 7/2013 | Puch-Solis et al. |
| 2013/0226967 | A1 | 8/2013 | Gross et al. |
| 2013/0278492 | A1 | 10/2013 | Stolarz et al. |
| 2014/0072947 | A1 | 3/2014 | Boguraev et al. |
| 2014/0089119 | A1 | 3/2014 | Fahn et al. |
| 2014/0297268 | A1* | 10/2014 | Govrin ............... G06Q 40/02 704/9 |
| 2014/0361973 | A1* | 12/2014 | Raux .................. G06F 3/167 345/156 |
| 2015/0269150 | A1* | 9/2015 | Carper ............... H04W 4/028 707/724 |

OTHER PUBLICATIONS

Extended European Search Report dated Aug. 28, 2015 for European Application No. 15164140.4 from European Patent Office, pp. 1-6, Munich, Germany.

Graphpad Software, "GraphPad—FAQ #1790", Mar. 23, 2012, pp. 1-5, United States [downloaded from http://www.graphpad.com/support/faqid/1790/ on May 28, 2015].

Shafer, G., "Dempster-Shafer Theory", Encyclopedia of Artificial Intelligence, 1992, pp. 330-331, 2nd Edition, Wiley, Spain, [downloaded from http://www.glennshafer.com/assets/downloads/articles/article48.pdf on May 28, 2015].

Liu, G. et al., "Towards Exploratory Hypothesis Testing and Analysis", Proceedings of the 27th International Conference on Data Engineering (ICDE '11), Apr. 11, 2011, pp. 745-756, ACM, United States.

Bachrach, Y. et al., "Crowd IQ—Aggregating Opinions to Boost Performance", Proceedings of the 11th International Conference on Autonomous Agents and Multiagent Systems—vol. 1 (AAMAS'12), Jun. 4-8, 2012, pp. 535-542, ACM, United States.

Dalvi, N. et al., "Aggregating Crowdsourced Binary Ratings", Proceedings of the International World Wide Web Conference Committee (WWW'13), May 13-17, 2013, pp. 285-294, ACM, United States.

* cited by examiner

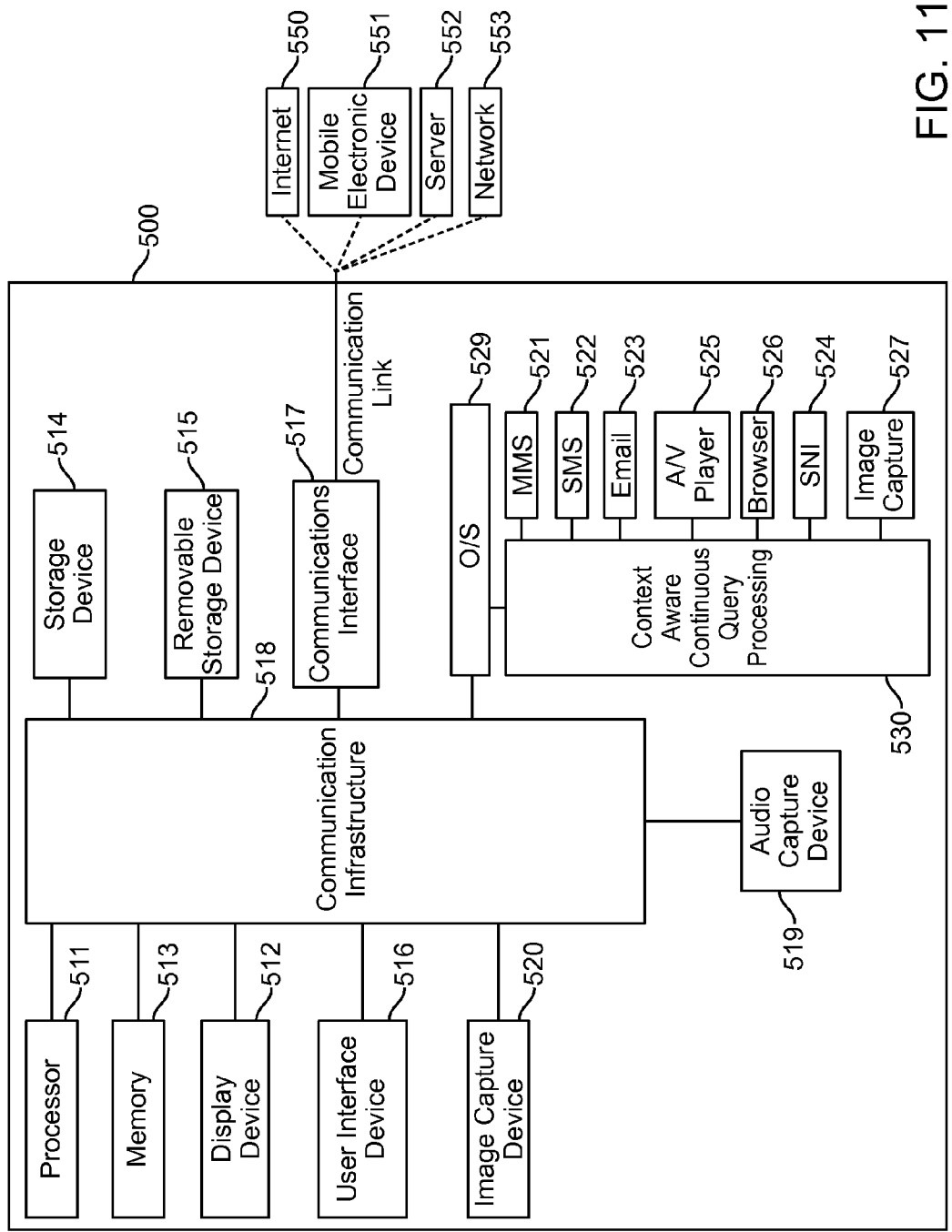

CONTEXT-AWARE HYPOTHESIS-DRIVEN AGGREGATION OF CROWD-SOURCED EVIDENCE FOR A SUBSCRIPTION-BASED SERVICE

TECHNICAL FIELD

One or more embodiments generally relate to providing an answer to a subscription-based query service and, in particular, to aggregating user-provided evidence and context for assigning belief values, using the belief values for determining sufficiency of hypotheses for answer information to a subscription-based query.

BACKGROUND

With many individuals having mobile electronic devices (e.g., smartphones), information may be shared amongst the individuals. For example, news worthy information and other information that may be of interest to particular individuals. With the number of individuals that may report information, the information may vary resulting in a user having to choose to rely on information that may or may not be reliable.

SUMMARY

One or more embodiments generally relate to providing an answer to a subscription-based query service. In one embodiment, the method includes acquiring context information and evidence information from one or more electronic devices based on a query. In one embodiment, one or more belief values are assigned based on the evidence information and the context information. In one embodiment, the belief values are aggregated for determining a score for competing hypotheses using a probabilistic model. In one embodiment, sufficiency of hypotheses is determined based on statistical significance for potential answer information to the query.

In one embodiment, a system is provided that includes an evidence collector module that aggregates evidence information and context information received from one or more electronic devices and assigns one or more belief values based on the evidence information and the context information. In one embodiment, a hypotheses score aggregator module aggregates the belief values for determining a score for competing hypotheses using a probabilistic model. In one embodiment, a sufficiency determiner module determines sufficiency of hypotheses based on statistical significance for potential answer information to a query based on a subscription of the one or more electronic devices.

In one embodiment a non-transitory computer-readable medium having instructions which when executed on a computer perform a method comprising: acquiring context information and evidence information from one or more electronic devices based on a query. In one embodiment, one or more belief values are assigned based on the evidence information and the context information. In one embodiment, the belief values are aggregated for determining a score for competing hypotheses using a probabilistic model. In one embodiment, sufficiency of hypotheses is determined based on statistical significance for potential answer information to the query.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 11 is a high-level block diagram showing an information processing system comprising a computing system implementing one or more embodiments.

DETAILED DESCRIPTION

Figure 1:
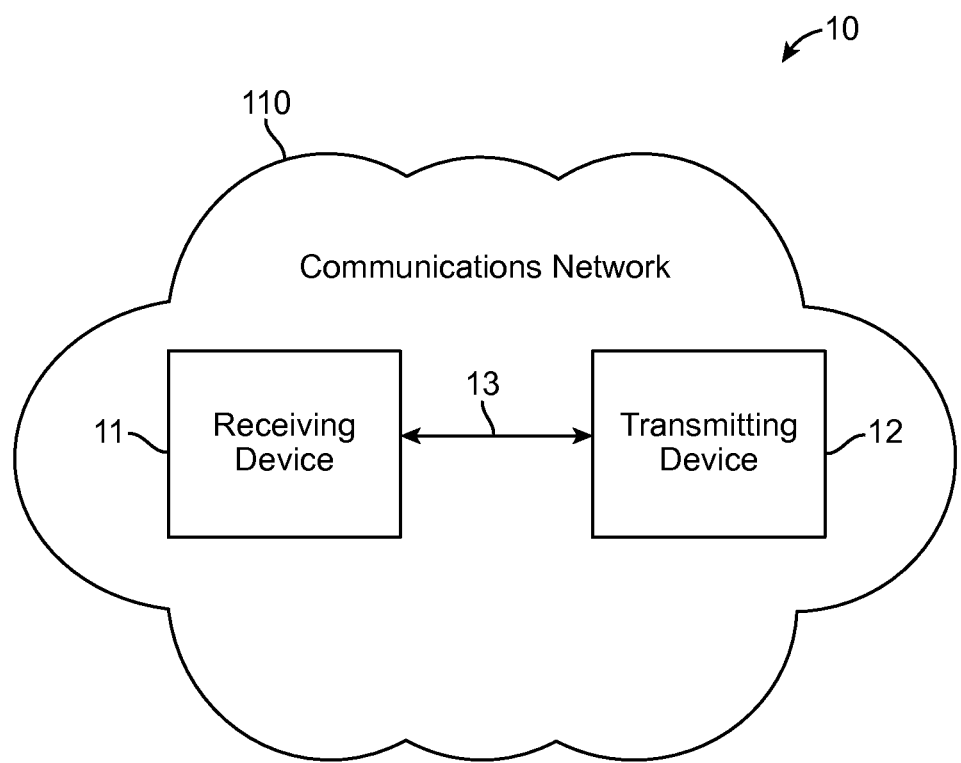
FIG. 1 shows a schematic view of a communications system, according to an embodiment.

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

Embodiments relate to providing an answer to a subscription-based query service. In one embodiment, the method includes acquiring context information and evidence information from one or more electronic devices based on a query. In one embodiment, one or more belief values are assigned based on the evidence information and the context information. In one embodiment, the belief values are aggregated for determining a score for competing hypotheses using a probabilistic model. In one embodiment, sufficiency of hypotheses is determined based on statistical significance for potential answer information to the query.

One or more embodiments provide a real-time subscription-based continuous query service. In one embodiment, the queries are registered by a service as long standing continuous queries at a centralized server (e.g., a cloud-based server). In one example embodiment, scenarios may include, but are not limited to, detecting wait times in amusement parks, cafeteria, restaurants, movie theatres, clubs, sporting events, etc., detecting processing times in department of motor vehicle (DMV) offices, bank or other offices, finding the cause(s) of slow moving traffic, determining which stocks have been bought/sold frequently, accuracy of location-based weather events, emergency events, etc. via real-time crowd-sourcing. In one or more embodiments, the subscribers of the services may participate by responding to polls, sharing their opinions, sharing pictures/videos, news information, etc. In one embodiment, the subscribers may also benefit by obtaining aggregated responses from other participants on the topics they have subscribed to. In one example embodiment, aggregation of crowd-sourced evidence information may include multiple formats, including, but not limited to, text, photographs, videos and responses to multiple-choice questions.

One or more embodiments accomplish the above-identified tasks to enable a subscription-based continuous query service. In one embodiment, a server side context-aware evidence-hypotheses model and crowd-sourced evidence aggregation process is used to accomplish critical tasks for a subscription-based continuous query service. In one embodiment, each subscription-based continuous query service registers certain long standing queries for evaluation. In one embodiment, a context-aware hypotheses formulator module combines context information including, but not limited to, location, movement information and time with the queries to formulate the hypotheses relevant to the target topic for the service.

In one embodiment, the context-aware evidence-hypotheses model for aggregation of crowd-sourced data includes interdependence among the hypotheses that is also captured and processed. In one embodiment, a combination of context information, content and user profile information is used to determine the belief value of each collected/received crowd-sourced evidence. In one embodiment, the belief values are self-adjusted as more crowd-sourced data is input. In one embodiment, the context-aware hypothesis-driven evidence aggregator module computes the score for each hypothesis by utilizing a probabilistic model. In one embodiment, quantification of the sufficiency of crowd-sourced data with respect to two aspects, namely, (a) validating a phenomenon or hypothesis, and (b) determining when to conclude collection of crowd-sourced data is provided.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), Bluetooth®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a Blackberry®). Such protocols may include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include mobile telephone devices, television systems, cameras, camcorders, a device with audio video capabilities, tablets, wearable devices, and any other device capable of communicating wirelessly (with or without the aid of a wireless-enabling accessory system) or via wired pathways (e.g., using traditional telephone wires). The communications operations may include any suitable form of communications, including, for example, voice communications (e.g., telephone calls), data communications (e.g., e-mails, text messages, media messages), video communication, or combinations of these (e.g., video conferences).

Figure 2:
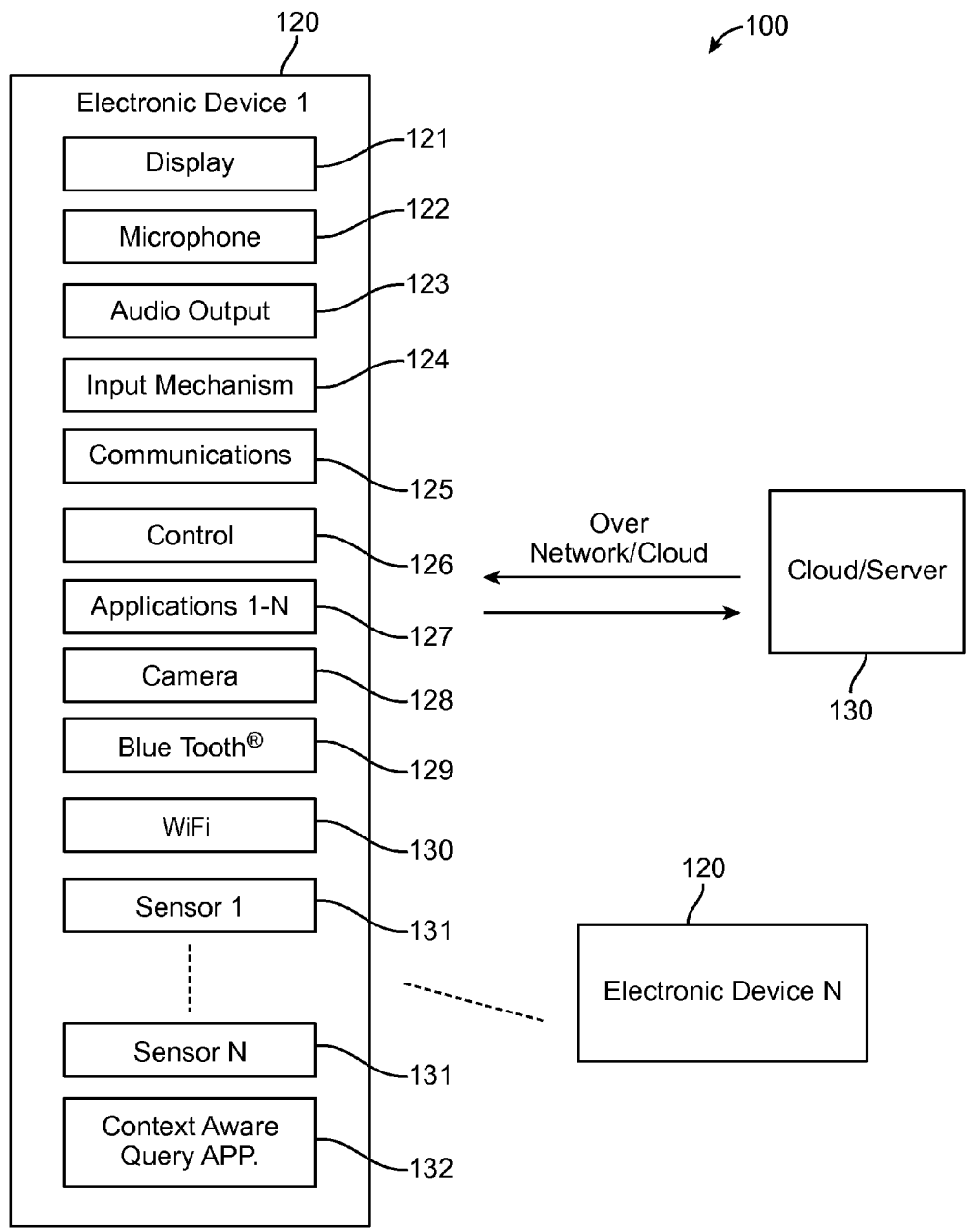
FIG. 2 shows a block diagram of architecture for a system including a server and subscribed electronic devices, according to an embodiment.

FIG. 2 shows a functional block diagram of an architecture system 100 that may be used for providing an answer to a subscription-based query service using one or more electronic devices 120. Both the transmitting device 12 and receiving device 11 may include some or all of the features of the electronics device 120. In one embodiment, the electronic device 120 may comprise a display 121, a microphone 122, an audio output 123, an input mechanism 124, communications circuitry 125, control circuitry 126, Applications 1-N 127, a camera module 128, a BlueTooth® module 129, a Wi-Fi module 130 and sensors 1 to N 131 (N being a positive integer), context-aware query application (APP) 132 and any other suitable components. In one embodiment, applications 1-N 127 are provided and may be obtained from a cloud or server 130, a communications network 110, etc., where N is a positive integer equal to or greater than 1. In one embodiment, the system 100 includes a context aware query application that works in combination with a cloud-based or server-based subscription service to collect evidence and context information, query for evidence and context information, and present requests for queries and answers to queries on the display 121.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., Bluetooth® headphones or a Bluetooth® headset).

In one embodiment, the display 121 may include any suitable screen or projection system for providing a display visible to the user. For example, display 121 may include a screen (e.g., an LCD screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), Bluetooth®, high frequency systems (e.g., 900 MHz, 2.4 GHz, and 5.6 GHz communication systems), infrared, GSM, GSM plus EDGE, CDMA, quadband, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the Bluetooth® protocol to couple the electronics device 120 with a Bluetooth® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), social networking applications (e.g., Facebook®, Twitter®, Etc.), an Internet browsing application, etc. In some embodiments, the electronics device 120 may include one or multiple applications operative to perform communications operations. For example, the electronics device 120 may include a messaging application, a mail application, a voicemail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera module 128 comprises one or more camera devices that include functionality for capturing still and video images, editing functionality, communication interoperability for sending, sharing, etc. photos/videos, etc.

In one embodiment, the BlueTooth® module 129 comprises processes and/or programs for processing BlueTooth® information, and may include a receiver, transmitter, transceiver, etc.

In one embodiment, the electronics device 120 may include multiple sensors 1 to N 131, such as accelerometer, gyroscope, microphone, temperature, light, barometer, magnetometer, compass, radio frequency (RF) identification sensor, etc. In one embodiment, the multiple sensors 1-N 131 provide information to the context-aware query APP 132.

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
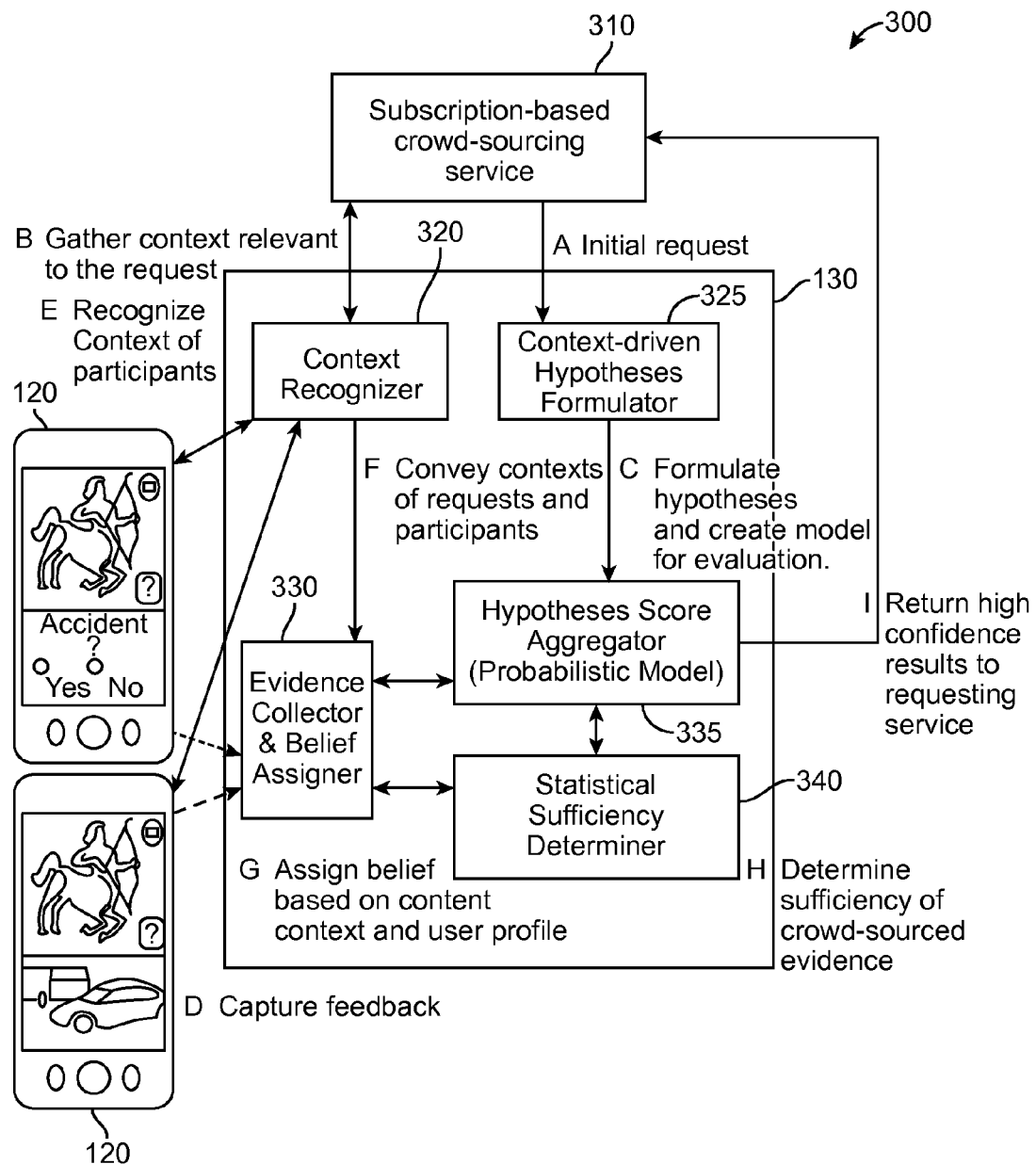
FIG. 3 shows an example system, according to an embodiment.

FIG. 3 shows an example system 300, according to an embodiment. In one embodiment, the system 300 includes one or more electronic devices 120 that communicate with the server 130 that includes a framework for a server side context-aware evidence-hypotheses model and evidence aggregation system 300 for a providing personalized crowd-sourcing engine with a context aware app 132 (FIG. 2). In one embodiment, one or more electronic devices 120 subscribe to a subscription-based crowd-sourcing service 310 to provide information, such as queries to pertinent information, for example, real-time wait times, traffic information, news information, location-based weather or emergency information, etc.

In one embodiment, the server 130 may include a context recognizer module 320, a context-driven hypotheses formulator module 325, an evidence collector and belief assignor module 330, a hypotheses score aggregator module 335 and a statistical sufficiency determiner module 340. In one embodiment, at reference A, an initial request is acquired by the context-driven hypotheses formulator module 325. In one embodiment, the initial request may be based on the type of subscription-based crowd-sourcing service 310 subscribed to. In one example embodiment, for a traffic-based subscription-based crowd-sourcing service 310, an initial request may include multiple initial queries, such as: did an accident occur, is their construction, is there a police event, are emergency vehicles present/responding/on-scene, is the traffic flowing smoothly, is the traffic barely moving, etc; for wait-time subscriptions: what is the wait-time, are there long lines, how many people are waiting to be served, etc.

In one embodiment, at reference B, context relevant to the initial request is acquired from the subscription-based crowd-sourcing service 310 by the context recognizer module 320. In one example embodiment, context relevant to a traffic-based subscription may include: photos, traffic speed, location, etc.; context relevant to a wait-time based subscription may include, location, time of response to a query, inside versus outside location, etc. In one embodiment, at reference C, hypotheses are formulated and a model is created for evaluation by the context-driven hypotheses formulator module 325. In one embodiment, at reference D, feedback is captured from one or more electronic devices 120 for a query from the subscription-based crowd-sourcing service 310 and sent to the evidence collector and belief assignor module 330.

In one embodiment, at reference E, context is recognized from one or more electronic devices 120 for a query from the subscription-based crowd-sourcing service 310 by the context recognizer module 320. In one embodiment, at reference F, contexts of requests and participants (e.g., users of the one or more electronic devices 120) are conveyed to the evidence collector and belief assignor module 330. In one embodiment, at reference G, belief scores/weights are assigned based on content, context and user profile information by the evidence collector and belief assignor module 330 and used by the hypotheses score aggregator module 335 and the statistical sufficiency determiner module 340.

In one embodiment, at reference H, sufficiency of crowd-sourced evidence is determined by the statistical sufficiency determiner module 340. In one embodiment, at reference I, high-confidence results are returned to the requesting service for distribution to subscribing electronic devices 120 (e.g., pushed or pulled from the subscription-based crowd-sourcing service 310).

Figure 4:
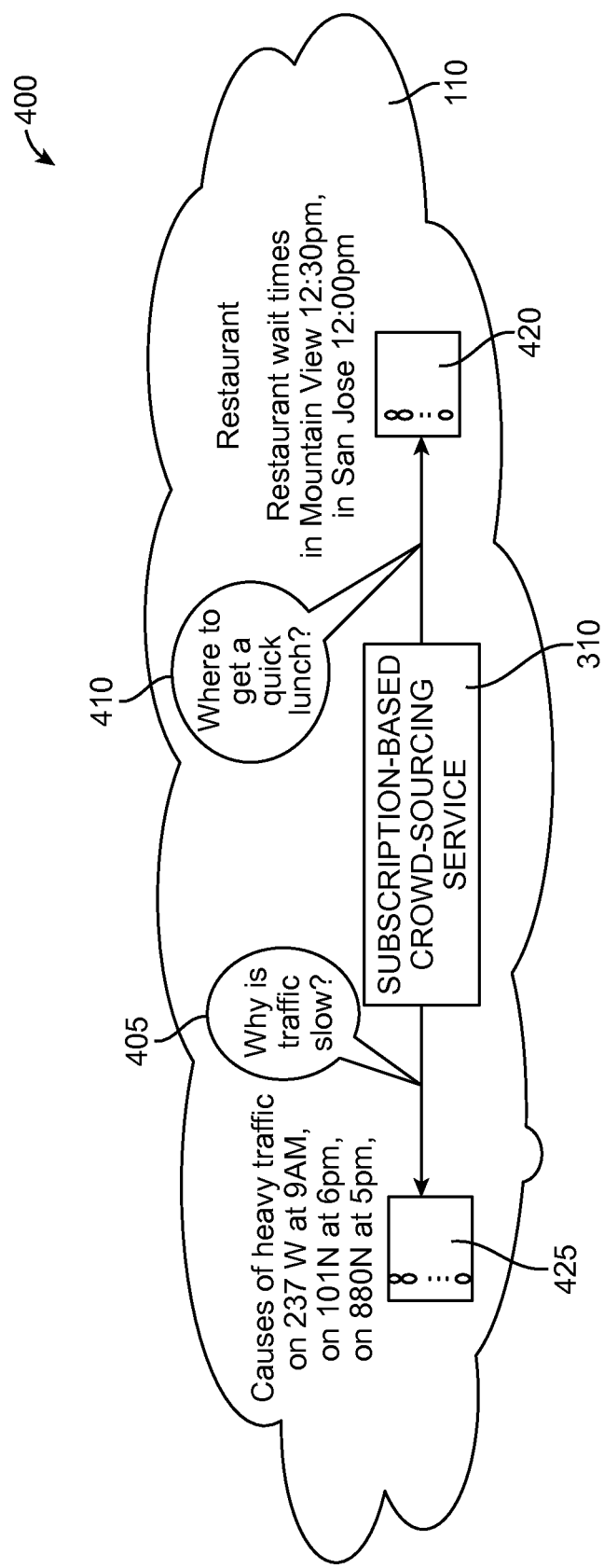
FIG. 4 shows an example of real-time context-aware hypotheses-driven aggregation of crowd-sourced evidence, according to an embodiment.

FIG. 4 shows an example diagram 400 of real-time context-aware hypotheses-driven aggregation of crowd-sourced evidence, according to an embodiment. In one embodiment, users of electronic devices 120 that register with the subscription-based crowd-sourcing service 310 may specify their preferences about the particular services they desire to subscribe to. In one example embodiment, some users may subscribe, for example, to traffic monitoring, while others may subscribe, for example, to restaurant wait time determination. In one example, a subset of these people may be interested in both traffic monitoring and restaurant wait-times.

In one embodiment, the subscription-based crowd-sourcing service 310 registers longstanding continuous queries to the context-aware hypotheses-driven crowd-sourced evidence aggregator system 300 (FIG. 3). In the example diagram 400, example services are traffic monitoring and restaurant wait time detection. For the restaurant wait time determination service, in an extreme case, the service would monitor and collect crowd-sourced data from all participants for processing. In one embodiment, context-awareness is used for formulating the hypotheses. In one embodiment, for each service, the contexts (e.g., context 420 and context 425) of the respective subscribers are taken into consideration for formulating the hypotheses.

In one example embodiment, for the restaurant wait-time example, most users seek to learn about wait times of cafeterias or restaurants around their work or home locations. Similarly, in one embodiment for the traffic monitoring example, most subscribers are interested in certain particular routes close to work, home and within the city they live in. In one embodiment, the context-aware hypotheses-driven crowd-sourced evidence aggregator system 300 creates a list of contexts for each service. In one example, for restaurant wait times, the contexts 420 may include locations (zip codes)={95112, 01604, 94555} and times={11:00 AM-1:00 PM, 6:00 PM-8:00 PM}. In one embodiment, the service combined together with the contexts forms the topic of investigation.

In one embodiment, for a group of users [e.g., restaurant wait times near 95112 between 11:00 AM and 1:00 PM] is determined as the topic 410. Similarly, in one example embodiment, heavy traffic context 425 may result in the topic 405. In one embodiment, the contexts 420/425 are derived by learning the spatio-temporal patterns of the subscribers for the service and combining them to form common spatio-temporal parameters of the topic. In one embodiment, similarly for the traffic monitoring service example, the formulated topic 405 is depicted.

In one embodiment, the context information is computed by the context recognizer module 320 (FIG. 3). In one embodiment, based on the context, the potential hypotheses or reasons for the topic are derived. In one example, "Restaurant 1 near 95112 has approximately 5-10 minute wait during lunch time" and "Restaurant 2's popular to-go salad boxes take less than 5 minutes to purchase" form potential hypotheses or suggestions for the subscribers. In one embodiment, similarly, for the traffic monitoring service, potential causes of slow moving traffic are accident, merging traffic, construction or police/emergency car ahead.

Figure 5:
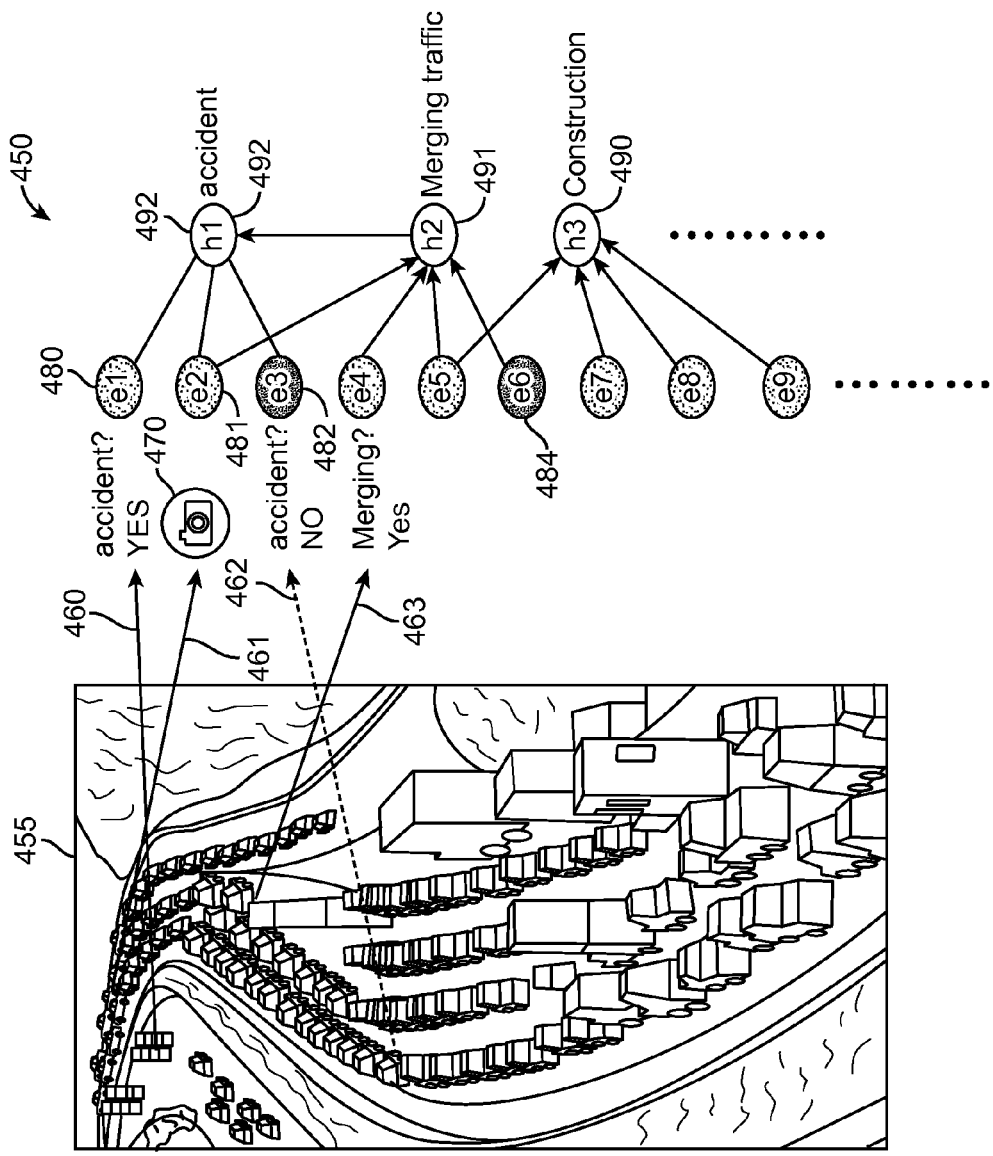
FIG. 5 shows an example evidence-hypotheses model for traffic monitoring, according to an embodiment.

FIG. 5 shows an example 450 of use of an evidence-hypotheses model for traffic monitoring, according to an embodiment. In one embodiment, an evidence-hypotheses model for aggregating the crowd-sourced data is used. In one embodiment, the crowd-sourced data (e.g., data/information 460, 461, 462, 463, etc. from a real-world circumstance 455) forms evidence (e.g., e1 480, e2 481, e3 482, e6 484, etc.) towards one or more hypotheses (e.g., h3 490, h2 491, h1 492). In one embodiment, context, such as a photograph 470 may be used as positive or negative evidence used for a hypotheses. In one example embodiment, the evidence information (e.g., e1 480 and e2 481) are depicted as positive evidence supporting one or more hypotheses, whereas evidence (e.g., e3 482 and e6 484) depict evidence refuting one or more hypotheses.

In one embodiment, the Evidence-Hypotheses model considers dependencies among the hypotheses. In one example embodiment, a dependency is depicted as the arrow between h2 491 and h1 492. In one example embodiment, the hypothesis h1 492 (e.g., accident) at times is caused by merging traffic. In one embodiment, in such cases, any evidence collected towards merging traffic is used towards accidents.

In one embodiment, the answers/responses to queries from the participants using an electronic device 120 are collected and combined with their contexts as well as user profiles (e.g., historical data of accuracy, etc.) to form evidence supporting or refuting a hypothesis. In one embodiment, the connections between the evidence and the hypotheses are depicted with an arrow from the evidence towards the respective hypotheses.

Figure 6:
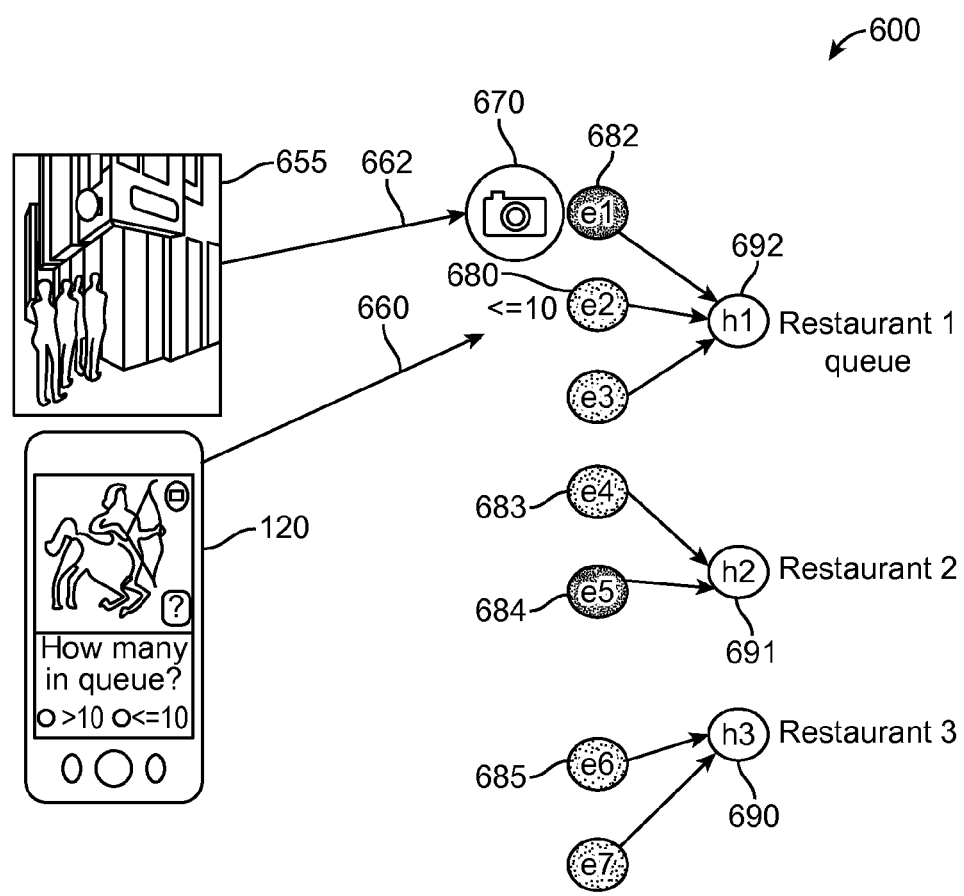
FIG. 6 shows an example evidence-hypotheses model for wait-times services, according to an embodiment.

FIG. 6 shows an example 600 of use of evidence-hypotheses model for wait-times services, according to an embodiment. In one embodiment, similarly as with diagram 450 (FIG. 5), the crowd-sourced data (e.g., data/information 660, 662, etc. from a real-world circumstance 655) forms evidence (e.g., e1 682, e2 680, e4 683, e5 684, e6 685, etc.) towards one or more hypotheses (e.g., h1 692, h2 691, h3 690). In one embodiment, context, such as a photograph 670 may be used as positive or negative evidence used for a hypotheses. In one example embodiment, the evidence information (e.g., e2 680, e4 683 and e6 685) are depicted as positive evidence supporting one or more hypotheses, whereas evidence (e.g., e1 682 and e5 684) depict evidence refuting one or more hypotheses. In one example embodiment, the hypotheses relate to wait times at different restaurants. In one example, h1 692 relates to a wait time at restaurant 1, h2 691 relates to a wait time at restaurant 2 and h3 690 relates to a wait time at a restaurant 3.

Figure 7:
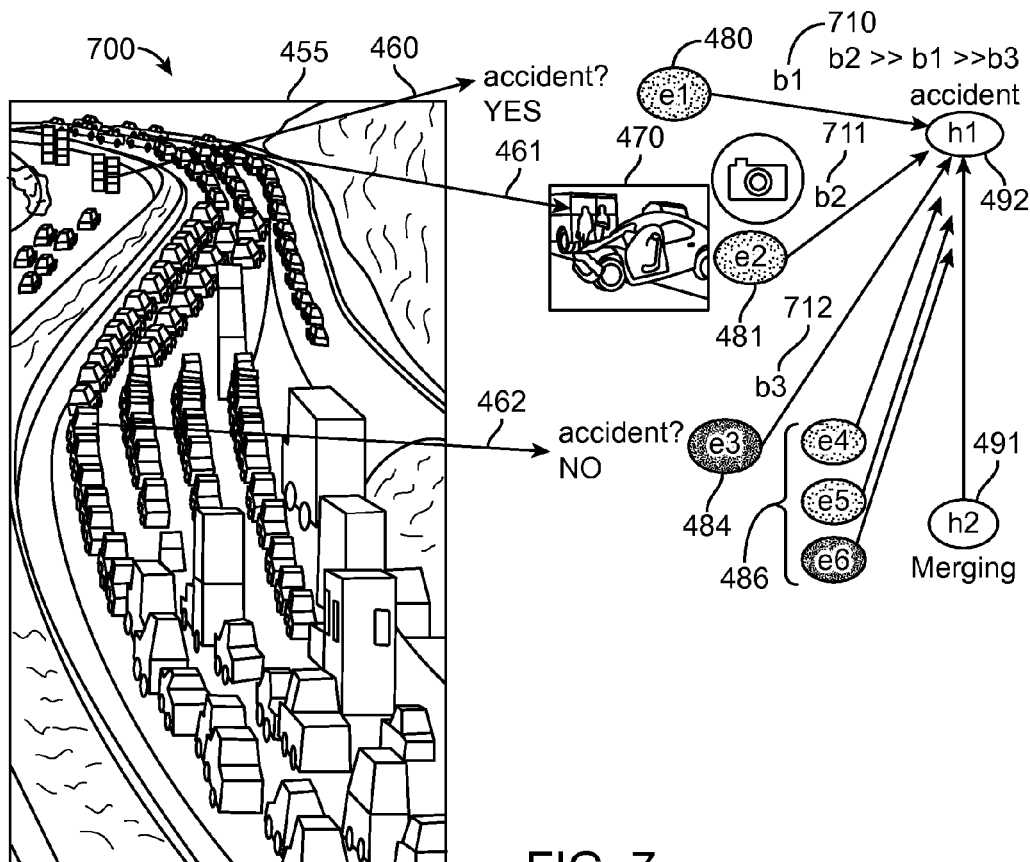
FIG. 7 shows an example for context-aware belief assignment for traffic monitoring, according to an embodiment.

FIG. 7 shows an example diagram 700 for context-aware belief assignment for traffic monitoring, according to an embodiment. In one embodiment, each evidence is assigned a belief value by the evidence collector and belief assignor module 330 (FIG. 3). In one embodiment, the belief is automatically assigned (e.g., by the system 300, a processor, etc.) as opposed to manually assigned (e.g., by a user). In one embodiment, a combination of context, content and user profile information is used to determine the belief value on each evidence provided. In one embodiment, as shown in diagram 700, the context of the participating users of electronic devices 120, such as their relative distance from the location of a hypothesized accident, speed and direction are taken into account. In one embodiment, the belief values (e.g., b1 710, b2 711 and b3 712) are used to determine a likely hypothesis, as well as combined hypotheses (e.g., h2 491 merging traffic may be used to determine the h1 492 hypothesis of an accident). In one example embodiment, the user profiles are taken into account to determine their trustworthiness based on their past participation and accuracy. In one embodiment, the content of the input (e.g., a photograph 470) plays an important role.

In one example embodiment, the inputs may include text, audio, pictures/photographs or videos. In one example embodiment, a module of the evidence collector and belief assignor module 330 may be used for interpreting the images, videos and audios into pieces of evidence. In one embodiment, a text analyzer is used for analyzing text input.

In one embodiment, overall the factors taken into account for the belief assignment are the contents of the answer, the participant's profile information as well as the participant's current context.

Figure 8:
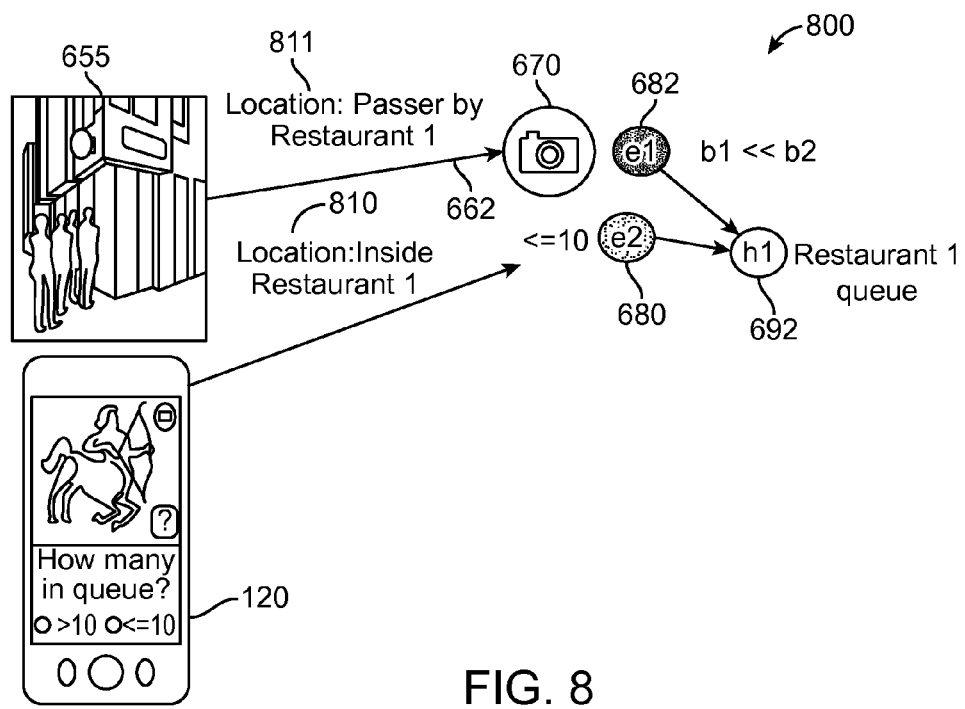
FIG. 8 shows an example for context-aware belief assignment for wait-time services, according to an embodiment.

FIG. 8 shows an example diagram 800 for context-aware belief assignment for wait-time services, according to an embodiment. In one embodiment, similarly as depicted in diagram 700, diagram 800 depicts context 811 of a passerby of a restaurant 1 and context 810 depicts a user of an electronic device 120 located inside the restaurant 1. In one example embodiment, the user located inside the restaurant 1 is taken as a higher belief value b2 than the belief value b1 of the passerby. In one example embodiment, the belief value b2 is used to determine the hypothesis h1 692 of the wait time for the restaurant 1.

For crowd-sourced data, it is not certain how much evidence will be collected for each hypothesis or each service. While existing hypotheses models assume that all the evidence pieces are collected before the model starts processing them, in case of crowd-sourced data, the pieces of evidence are streamed in at an unknown rate. In one embodiment, the belief values are self-adjusted as more data is input.

Figure 9:
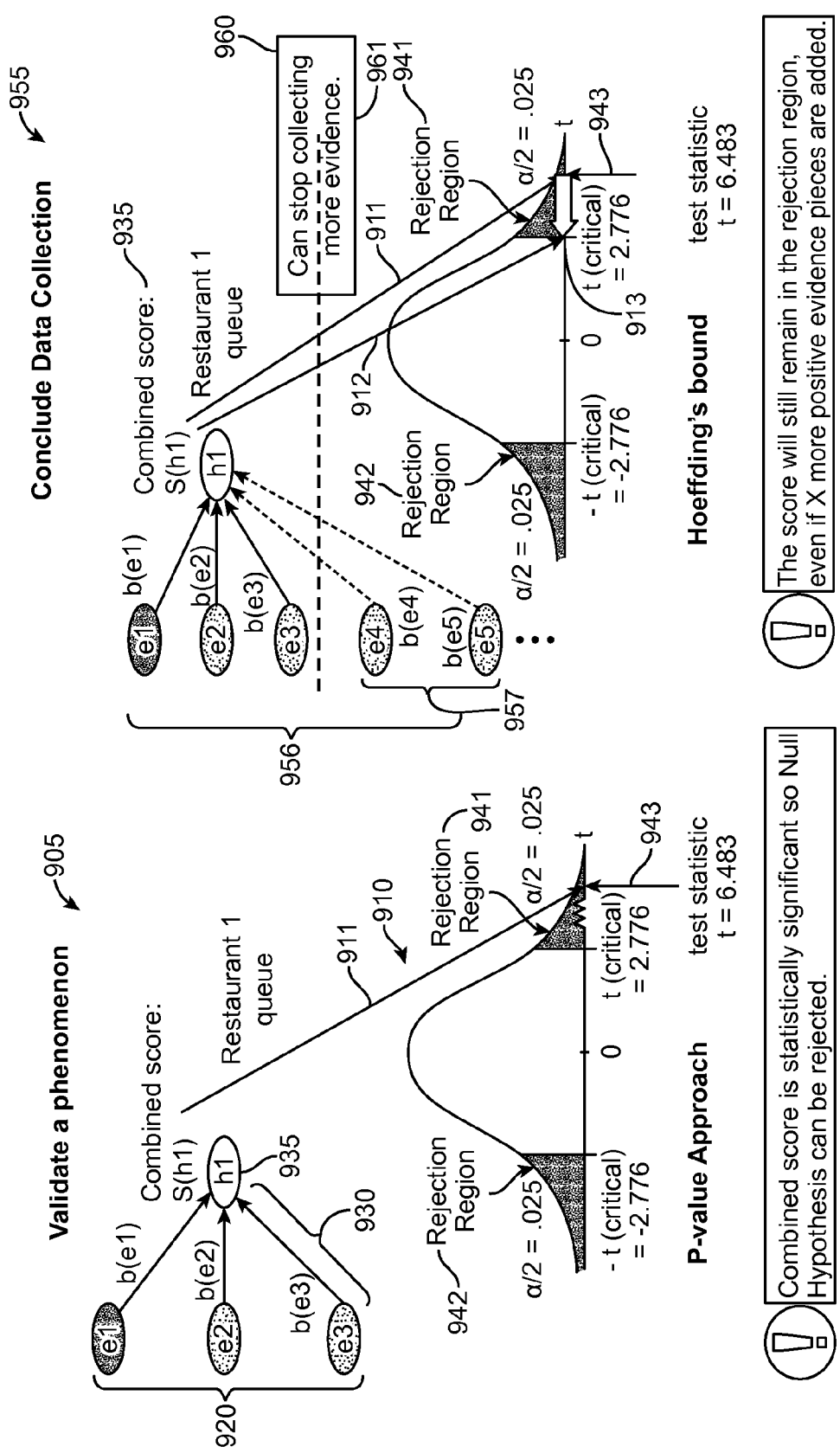
FIG. 9A shows an example sufficiency determination for validating a hypotheses, according to an embodiment.
FIG. 9B shows an example of concluding crowd-sourced data collection, according to an embodiment.

FIG. 9A shows an example diagram 905 of sufficiency determination for validating a hypothesis, according to an embodiment. In one embodiment, the belief values 930 for the evidence 920 are aggregated to compute the scores for each competing hypothesis (e.g., h1 935). In one embodiment, a probabilistic model is used for the aggregation. In one example embodiment, a Dempster-Shafer (DS) model may be used. In other embodiments, other probabilistic models may be employed.

In one embodiment, due to the dynamic and uncertain nature of the crowd-sourced data, the hypotheses scores are statistically evaluated for significance before being returned to the subscribers of the service. As depicted in diagram 905, only the hypotheses with sufficient statistical significance are returned to the service 310 as potential answers. In one embodiment, the Null hypotheses are the negation of each hypothesis. In one example embodiment, for a hypothesis h1 935="Restaurant 1 wait time around 12 PM is less than 5 minutes," the corresponding null hypothesis is h0="Restaurant 1 wait time around 12 PM exceeds 5 minutes." Therefore, in one embodiment, as shown in the curve 910, if the null hypothesis score is projected (e.g., shown as arrow 911 pointing to the statistic 943) in the rejection region 941/942, based on the supporting and refuting crowd-sourced evidence, the aggregator may respond with certainty that h1 935 is valid. In one example embodiment, many of the standard statistical significance tests may be employed including, but not limited to, t-test and z-test. The choice of the statistical test is based on the number and properties of collected crowd-sourced evidence.

FIG. 9B shows an example diagram 955 of concluding crowd-sourced data collection, according to an embodiment. In one embodiment, an aspect of the crowd-sourced data aggregation is when to conclude the collection of more evidence. As shown in diagram 955, one embodiment determines when to stop collecting more data (e.g., of evidence 956, evidence 957 may not be required) based on the difference between the significance test (e.g., 911 and 912 values). In one embodiment, here $t[H0]$=6.483) and the $t[critical]$ (=2.776), which marks the boundary 960/961 between the rejection and acceptance regions. In one embodiment, if this difference is significantly large such that even if multitude of evidence are added, the combined score for the hypothesis would still remain in the rejection region (e.g., 941/942), the system 300 (FIG. 3) indicates that sufficient crowd-sourced data has been collected.

In one example embodiment, a static difference threshold may be used. In one embodiment, the threshold must change based on the number of evidence, the belief scores and the importance of the hypotheses. In one example embodiment, the statistical result of Hoeffding's bound is used to determine this threshold dynamically.

In one embodiment, the statistical sufficiency determiner module 340 (FIG. 3) computes and responds to the hypotheses score aggregator module 335 when to conclude the answers with certainty and also indicates when sufficient crowd-sourced data has been collected. In one embodiment, the hypotheses score aggregator module 335 then returns the responses to each service 310 and also at times when scores of several competing hypotheses are higher than a certain threshold, multiple answers may also be returned. In one example embodiment, both Restaurant 1 and Restaurant 2 may have low wait times, thus both are returned as answers.

Figure 10:
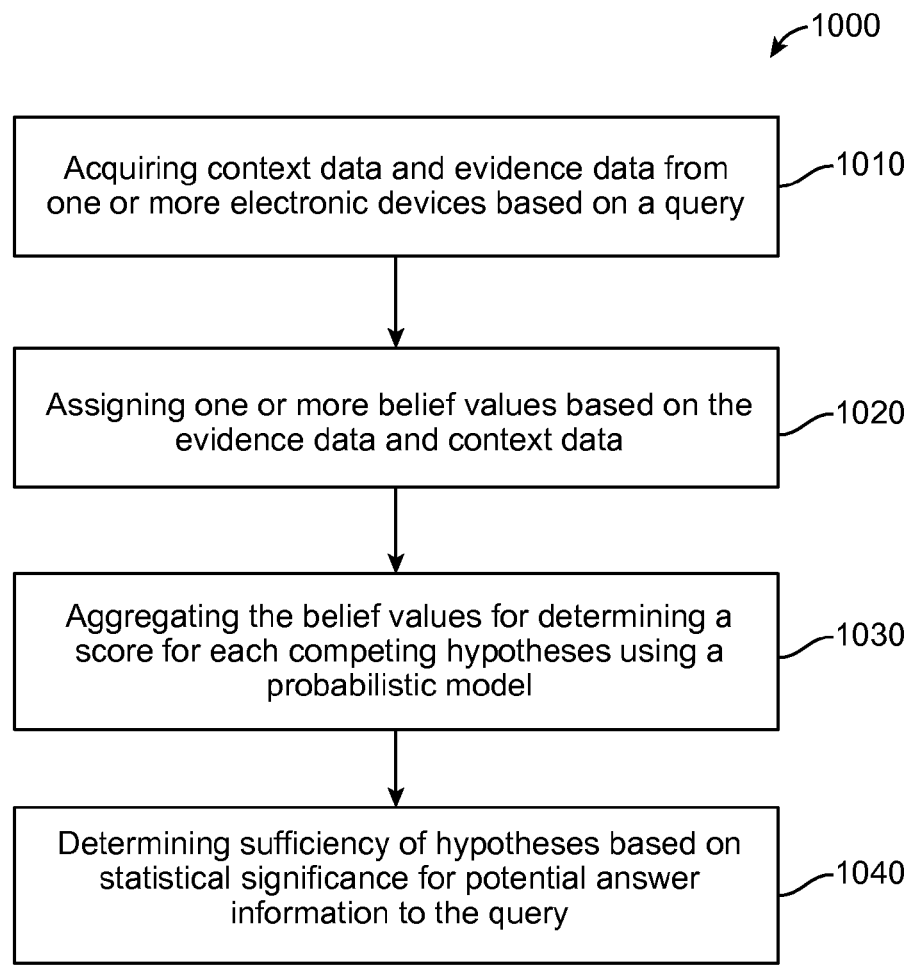
FIG. 10 shows a process for providing an answer to a subscription-based query service, according to one embodiment.

FIG. 10 shows a process 1000 for providing an answer to a subscription-based query service, according to one embodiment. In one embodiment, in block 1010 context information and evidence information is acquired from one or more electronic devices (e.g., electronic devices 120, FIG. 2) based on a query (e.g., from a subscription-based crowd-sourcing service 310 (FIG. 3). In one embodiment, in block 1020 one or more belief values are assigned (e.g., by an evidence collector and belief assignor module 330 of system 300) based on the evidence information and the context information.

In one embodiment, in block 1030 the belief values are aggregated (e.g., by a hypotheses score aggregator 335, FIG. 3) for determining a score for competing hypotheses using a probabilistic model. In one embodiment, in block 1040 sufficiency of hypotheses are determined (e.g., by a statistical sufficiency determiner module 340, FIG. 3) based on statistical significance for potential answer information to the query.

In one embodiment, process 1000 may include receiving an initial request for the query based on a subscribed service (e.g., service 310, FIG. 3) by the one or more electronic devices. In one embodiment, process 1000 may include formulating a context-aware hypothesis that is relevant to the query using the context information and the evidence information from the one or more electronic devices by combining the evidence information and the context information. In one embodiment, the context data comprises one or more of location information, movement information and time.

In one embodiment, process 1000 may further include identifying dependencies among multiple hypotheses for determining the sufficiency of hypotheses. In one embodiment, the evidence information comprises an aggregation of crowd-sourced content in response to the query. In one embodiment, the belief values are based on evidence content, the context information and user profile information. In one example embodiment, the user profile information comprises past participation information and accuracy regarding answers to previous queries based on the subscribed service.

In one embodiment, the process 100 may include determining when to conclude collection of crowd-sourced evidence information and context information based on the difference between the statistical significance of aggregated hypotheses score and the boundary between the rejection region and the acceptance region. In one embodiment, the answer information is determined by a cloud-based service and transmitted to the one or more electronic devices. In one embodiment, a DS model is used for aggregation of crowd-sourced data. In one example embodiment, Bayesian networks are used for aggregation of crowd-sourced data.

FIG. 11 is a high-level block diagram showing an information processing system comprising a computing system 500 implementing one or more embodiments. The system 500 includes one or more processors 511 (e.g., ASIC, CPU, etc.), and may further include an electronic display device 512 (for displaying graphics, text, and other data), a main memory 513 (e.g., random access memory (RAM), cache devices, etc.), storage device 514 (e.g., hard disk drive), removable storage device 515 (e.g., removable storage drive, removable memory module, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as Wi-Fi, Cellular), a network interface (such as an Ethernet card), a communications port, or a PCMCIA slot and card).

The communication interface 517 allows software and data to be transferred between the computer system and external devices through the Internet 550, mobile electronic device 551, a server 552, a network 553, etc. The system 500 further includes a communications infrastructure 518 (e.g., a communications bus, cross bar, or network) to which the aforementioned devices/modules 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of one or more embodiments in a mobile wireless device (e.g., a mobile phone, smartphone, tablet, mobile computing device, wearable device, etc.), the system 500 further includes an image capture device 520, such as a camera 128 (FIG. 2), and an audio capture device 519, such as a microphone 122 (FIG. 2). The system 500 may further include application modules as MMS module 521, SMS module 522, email module 523, social network interface (SNI) module 524, audio/video (AV) player 525, web browser 526, image capture module 527, etc.

In one embodiment, the system 500 includes a context aware continuous query processing module 530 that may implement a context-aware evidence-hypotheses model and evidence aggregation system 300 processing similar as described regarding (FIG. 3), and components in block diagram 200 (FIG. 2). In one embodiment, the context aware continuous query processing module 530 may implement the system 300 (FIG. 3) and flow diagram 1000 (FIG. 10). In one embodiment, the context aware continuous query processing module 530 along with an operating system 529 may be implemented as executable code residing in a memory of the system 500. In another embodiment, the context aware continuous query processing module 530 may be provided in hardware, firmware, etc.

As is known to those skilled in the art, the aforementioned example architectures described above, according to said architectures, can be implemented in many ways, such as program instructions for execution by a processor, as software modules, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for providing an answer to a subscription-based query service comprising:
   acquiring, from one or more electronic devices, context information and evidence information relevant to a query received from the one or more electronic devices, wherein the evidence information comprises one or more pieces of evidence;
   formulating one or more competing hypotheses relevant to the query based on the context information and the evidence information;
   assigning one or more belief values to the one or more pieces of evidence based on the evidence information and the context information;
   for each hypothesis of the one or more competing hypotheses:
      determining a corresponding score for the hypothesis by aggregating the one or more belief values using a probabilistic model; and
      determining whether the hypothesis is sufficient based on statistical significance of the corresponding score for potential answer information to the query; and
   providing, to the one or more electronic devices, answer information to the query for display on the one or more electronic devices, wherein the answer information is based on at least one of the one or more competing hypotheses determined sufficient.

2. The method of claim 1, further comprising:
   receiving an initial request for the query based on a subscribed service by the one or more electronic devices; and
   formulating a context-aware hypothesis that is relevant to the query using the context information and the evidence information by combining the evidence information and the context information.

3. The method of claim 2, wherein the context information comprises one or more of location information, movement information, and time.

4. The method of claim 3, further comprising identifying one or more dependencies among the one or more competing hypotheses for determining sufficiency of the one or more competing hypotheses.

5. The method of claim 4, wherein the evidence information comprises an aggregation of crowd-sourced content in response to the query.

6. The method of claim 5, wherein the one or more belief values are based on the evidence information, the context information, and user profile information of the one or more electronic devices.

7. The method of claim 6, wherein the user profile information comprises past participation information and accuracy regarding one or more answers to one or more previous queries based on the subscribed service.

8. The method of claim 7, further comprising:
   determining whether to conclude collection of crowd-sourced evidence information and context information based on a difference between a statistical significance of an aggregated score for the one or more competing hypotheses and a boundary between a rejection region and an acceptance region.

9. The method of claim 1, wherein the answer information is determined by a cloud-based server.

10. The method of claim 9, wherein the one or more electronic devices comprise a mobile electronic device.

11. The method of claim 10, wherein the mobile electronic device comprises one or more of: a mobile telephone, a wearable computing device, a tablet device, and a mobile computing device.

12. A system comprising:
at least one processor; and
a non-transitory processor-readable memory device storing instructions that when executed by the at least one processor causes the at least one processor to perform operations including:
acquiring, from one or more electronic devices, context information and evidence information relevant to a query received from the one or more electronic devices, wherein the evidence information comprises one or more pieces of evidence;
formulating one or more competing hypotheses relevant to the query based on the context information and the evidence information;
assigning one or more belief values to the one or more pieces of evidence based on the evidence information and the context information;
for each hypothesis of the one or more competing hypotheses:
determining a corresponding score for the hypothesis by aggregating the one or more belief values using a probabilistic model; and
determining whether the hypothesis is sufficient based on statistical significance of the corresponding score for potential answer information to the query; and
providing, to the one or more electronic devices, answer information to the query for display on the one or more electronic devices, wherein the answer information is based on at least one of the one or more competing hypotheses determined sufficient.

13. The system of claim 12, wherein the operations further comprise:
receiving an initial request for the query based on the subscription by the one or more electronic devices; and
formulating a context-aware hypothesis that is relevant to the query using the context information and the evidence information by combining the evidence information and the context information.

14. The system of claim 13, wherein the context information comprises one or more of location information, movement information, and time.

15. The system of claim 14, wherein the operations further comprise:
identifying one or more dependencies among the one or more competing hypotheses for determining sufficiency of the one or more competing hypotheses.

16. The system of claim 15, wherein the evidence information comprises an aggregation of crowd-sourced content in response to the query.

17. The system of claim 16, wherein the one or more belief values are based on the evidence information, the context information, and user profile information of the one or more electronic devices.

18. The system of claim 17, wherein the user profile information comprises past participation information and accuracy regarding one or more answers to one or more previous queries based on a subscribed service.

19. The system of claim 18, wherein the operations further comprise:
determining whether to conclude collection of crowd-sourced evidence information and context information based on a difference between a statistical significance of an aggregated score for the one or more competing hypotheses and a boundary between a rejection region and an acceptance region.

20. The system of claim 12, wherein the answer information is determined by a cloud-based server.

21. The system of claim 20, wherein the one or more electronic devices comprises a mobile electronic device, and the mobile electronic device comprises one or more of: a mobile telephone, a wearable computing device, a tablet device, or a mobile computing device.

22. A non-transitory computer-readable medium having instructions which when executed on a computer perform a method comprising:
acquiring, from one or more electronic devices, context information and evidence information relevant to a query received from the one or more electronic devices, wherein the evidence information comprises one or more pieces of evidence;
formulating one or more competing hypotheses relevant to the query based on the context information and the evidence information;
assigning one or more belief values to the one or more pieces of evidence based on the evidence information and the context information;
for each hypothesis of the one or more competing hypotheses:
determining a corresponding score for the hypothesis by aggregating the one or more belief values using a probabilistic model; and
determining whether the hypothesis is sufficient based on statistical significance of the corresponding score for potential answer information to the query; and
providing, to the one or more electronic devices, answer information to the query for display on the one or more electronic devices, wherein the answer information is based on at least one of the one or more competing hypotheses determined sufficient.

23. The medium of claim 22, further comprising:
receiving an initial request for the query based on a subscribed service by the one or more electronic devices; and
formulating a context-aware hypothesis that is relevant to the query using the context information and the evidence information by combining the evidence information and the context information.

24. The medium of claim 23, wherein the context information comprises one or more of location information, movement information, and time.

25. The medium of claim 24, further comprising identifying one or more dependencies among the one or more competing hypotheses for determining sufficiency of the one or more competing hypotheses, wherein the evidence information comprises an aggregation of crowd-sourced content in response to the query.

26. The medium of claim 25, wherein the one or more belief values are based on the evidence information, the context information, and user profile information.

27. The medium of claim 26, wherein the user profile information comprises past participation information and accuracy regarding one or more answers to one or more previous queries based on the subscribed service.

28. The medium of claim 27, further comprising:
determining whether to conclude collection of crowd-sourced evidence information and context information based on a difference between a statistical significance of an aggregated score for the one or more competing hypotheses and a boundary between a rejection region and an acceptance region.

29. The medium of claim 28, wherein the answer information is determined by a cloud-based server.

30. The medium of claim 29, wherein the one or more electronic devices comprises a mobile electronic device, and the mobile electronic device comprises one or more of: a mobile telephone, a wearable computing device, a tablet device, or a mobile computing device.

* * * * *